United States Patent [19]
Goodwin et al.

[11] 4,165,974
[45] Aug. 28, 1979

[54] MOLD LUBRICANT AND METHOD

[76] Inventors: George I. Goodwin, P.O. Box 348, Bloomfield Hills, Mich. 48013; John L. Margrave, P.O. Box 6914, Houston, Tex. 77005; Robert E. Wagner, 1511 Mark Dr., Mount Prospect, Ill. 60056

[21] Appl. No.: 341,841
[22] Filed: Mar. 16, 1973
[51] Int. Cl.² .................................... C03B 39/00
[52] U.S. Cl. ................................. 65/26; 252/58
[58] Field of Search .................... 65/26, 24, 170; 117/5.3, 127; 252/58, 12

[56] References Cited

U.S. PATENT DOCUMENTS

| 2,201,049 | 5/1940 | Moore | 65/26 |
| 3,266,107 | 8/1966 | Groteke | 117/5.3 X |
| 3,347,650 | 10/1967 | Barkhau | 65/26 |
| 3,510,337 | 5/1970 | Katzer et al. | 117/5.3 |
| 3,523,016 | 8/1970 | Mattos | 65/26 X |
| 3,607,747 | 9/1971 | Ishikawa et al. | 252/12 X |
| 3,637,871 | 1/1972 | Park et al. | 252/58 X |
| 3,674,432 | 7/1972 | Margrave et al. | 423/489 X |

FOREIGN PATENT DOCUMENTS 1074795  2/1960  Fed. Rep. of Germany ............ 252/12

Primary Examiner—Kenneth M. Schor
Attorney, Agent, or Firm—Robert E. Wagner; Gerald T. Shekleton

[57] ABSTRACT

A lubricant for improved performance in glass molding. The lubricant is smokeless, odorless, non-toxic and non-combustible. It is applied infrequently, such as once a shift or less. The lubricant is carbon monofluoride $(CF_x)_n$ wherein "x" is about 0.7 or, preferably, above 1.00. Novel methods of application of the lubricant are disclosed.

14 Claims, 3 Drawing Figures

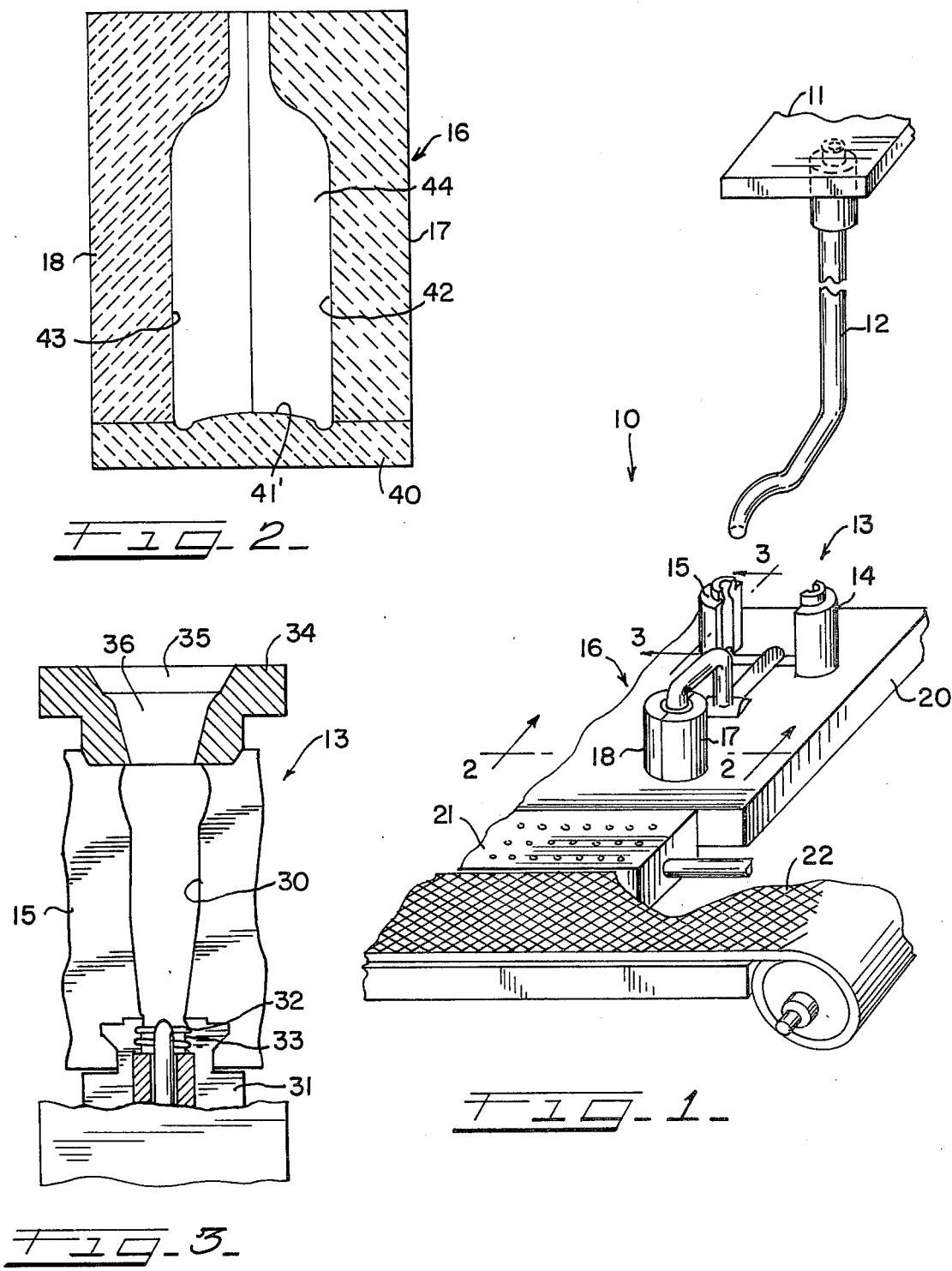

MOLD LUBRICANT AND METHOD

This invention relates to improvements in glass manufacturing in general and, more specifically, is directed to a new and improved lubricant and method for applying the same to molds used in glass manufacture. More specifically, the present invention finds special application to the neck rings, bottom plates and cavities of cast iron molds which are used to shape molten glass into useful shapes, such as bottles, jugs and the like. Such lubricant, when properly applied, prevents the molten glass from sticking to the surfaces contacting the molten glass. A single application, when properly applied, endures for a long period of time without the need for repeated applications as in conventional lubricants. The novel lubricant is smokeless, odorless and has a high temperature characteristic, enabling it to withstand the heat encountered in the molding operation.

In molding of glass bottles, containers and the like, gobs of molten glass at temperatures of about 1800°-2200° F. are dropped down a gob chute into a closed split cavity iron mold at a temperature of the order of aout 1000° F. In one technique, the mold may then be inverted and compressed air blown into the mold to spread the glass to the shape of the cavity and thereby shape the article. The halves of the mold are then separated and the formed article is removed while still hot. In this technique of manufacture, when the molds are closed, lubricant is sprayed into the cavity and the process is repeated.

In another type of molding operation, a parison is formed in one mold, which is commonly referred to as the blank mold. After forming the parison, it is transferred to another mold for final shaping, the latter mold sometimes being referred to as the blow mold. In this type of molding operation, lubricant is either sprayed onto the mold cavity or, in the alternative, applied by hand swabbing, which is by far the most prevalent lubricating method. Hand swabbing is accomplished as follows: When the mold operator detects that a part of a mold is sticking to the glass, or on a predetermined schedule, he will manually swab that portion of the mold with a cotton swab after dipping it into lubricant. The number of bottles which have been formed during the period when sticking has occurred are rejected, being manually removed by the operator. They are recycled for remelting and processing.

A typical molding operation involving hand swabbing on a predetermined schedule requires the machine operator to swab each mold about every quarter or half hour, depending upon the type of job. In many instances swabbing must be done even more frequently. One drawback with known types of lubricants is that they tend to build up in the mold, necessitating subsequent cleaning by hand sandblasting or the like. The sandblasting causes the mold to wear away in the cavity and, after repeated sand cleanings, the shape of the cavity is so worn and distorted that it becomes necessary to discard the mold. Moreover, during the glass manufacturing operation, when the deposits of lubricant build up and solidify, they cause an irregularity in the surface of the bottle which requires it to be rejected.

One other drawback to hand swabbing is that the excessive lubricant on the mold after application is embedded in the surface of the bottle and, therefore, requiring rejection of several bottles before the excess lubricant is carried away by the bottles being manufactured. These have not been too great a concern since the bottles can be recycled and remelted. Nevertheless, considerable expense is involved in the cost of manufacture of a bottle to the point where it is in a shape-sustaining state immediately before entering the annealing lehr, and this expense is eliminated by the novel lubricant and technique of the present invention.

One other disadvantage of the present technique is that in some instances, the molten gob of glass must be diverted into a water bath to permit the swabbing operation to take place. In the section of the machine undergoing lubrication, one or more cycles of molding may be missed because of the time required for the swabbing operation. This ultimately adds to the loss of productivity, which was noted above with respect to the non-uniform distribution of the lubricant on the mold surfaces.

One further problem is that of sticking of the bottle to the neck ring, as well as the blank mold. Another area of sticking is the bottom plate in the blow mold. These areas have presented a lubrication problem because of the inability of the lubricant to withstand the high temperature and mechanical abrasion of the gob and finished product in the molding operation. Moreover, in hand swabbing and spray lubrication, the lubricant is frequently dripped on other parts of the molding machine, presenting a potential five hazard.

The present invention provides a solution to the above problems and is particularly useful in providing permanent lubrication for the parts of the mold, including the neck ring, bottom plate and mold cavity. It eliminates all of the disadvantages set forth above, resulting in longer mold life, no pollution, improved productivity and eliminating a potential fire hazard.

The lubricant of the present invention may be described as graphite fluoride $(CF_x)_n$. In the preferred form, it is a stable carbon monofluoride having a maximum super stoichiometric fluorine to carbon ratio prepared by the method described in U.S. Pat. No. 3,674,432. In the preferred form, the fluorine to carbon ratio is greater than 0.99/1.00 or 1.12/1.00, which provides for a more stable composition capable of withstanding high heat while retaining its lubricative properties. The method by which the lubricant is applied will be described in greater detail hereinafter in connection with the accompanying drawings.

It is an ojbect of this invention to provide a new and improved lubricant and method for the lubircation of molds and related equipment in the manufacture of glass.

It is a further object of this invention to provide a new and improved method of lubricating molds for manufacturing glass which is permanent, does not cause any pollution and does not deteriorate under the high temperature experienced during molding.

It is still a further object of this invention to provide a new and improved lubricant for glass manufacturing, which lubricant is required to be applied only sparingly, thereby reducing the total volume of lubricant needed in the molding operation which, in turn, reduces shipping costs when compared with known types of lubricants.

These and additional objects of the present invention will become apparent upon consideration of the accompanying drawings and succeeding description.

IN THE DRAWINGS

FIG. 1 is a fragmentary perspective view of one section of a glass manufacturing machine with much of the machine detail omitted for purposes of clarity;

FIG. 2 is a cross-sectional view of a representative blow mold taken along line 2—2 of FIG. 1; and FIG. 3 is an elevational view of one-half of a representative blank mold and neck ring with the funnel shown in cross section.

Referring now to FIG. 1, reference character 10 indicates a fragmentary perspective view of a conventional type of glass manufacturing operation. The forehearth is illustrated at 11 and has a cutting means (not shown) which cuts molten gobs of glass into predetermined lengths for transmission down the chute 12 into the blank mold indicated at 13. The blank mold 13 consists of two mold halves 14 and 15, which halves are shown in the open condition, or the condition assumed after the parison or blank is formed and the blank has been transferred to the blow mold indicated at 16. The blow mold includes mold halves 17 and 18. Both the blank mold 13 and blow mold 16 are supported on the bed 20 of the glass molding machine, which may be of any known type.

Upon completion of the molding operation, the molded glass article is pushed by suitable means (not shown) onto a dead plate 21 for cooling and thereafter is transferred onto a conveyor 22 of known type, which conveys the finished bottles to the annealing lehr.

In summary, in the molding operation shown in FIG. 1, the predetermined size of hot gob is conveyed down the chute 12 into the blank mold 13. The neck and general shape of the bottle is formed and then it is transferred into the blank mold 16 where it is inflated to conform to the shape of the blow mold. Therafter, it is annealed and packed for shipment to the processor.

In prior lubricating techniques, both the blank and blow molds, as well as the neck ring and the gob chute 12, receive liberal applications of a carbonaceous material, which may be a petroleum product or oil-hydrocarbon mixture. It is sometimes referred to in the trade as "dope." The operator of the machine will, at predetermined periods, lubricate the mold by using a cotton swab or the like, swabbing the mold surfaces with liberal applications of dope. Any other part of the machine which comes into contact with the hot glass is similarly swabbed, such as the neck ring, chute, etc. The dope, when applied to the hot surfaces, gives off large quantities of smoke and in some cases even causes the swab to burst into flames. The swabbing technique for lubrication is somewhat haphazard and, as might be expected, the distribution is non-uniform. If not carefully applied, the lubricant will drip onto other parts of the machine, creating a first hazard as well as being unsightly and untidy.

With the lubricant of the present invention, all of the foregoing problems outlined are eliminated, as well as several advantages being gained. Referring now to FIG. 3, the blank mold is shown in elevation and includes a cavity 30 which is generally of a shape similar to but smaller than the finished bottle. At the bottom of the mold cavity 30 is an opening, which receives a neck ring 31 having surfaces 32 and 33 which form the threads on the finish of the bottle. At the upper end of the cavity 30 is a funnel 34 which guides the molten gob of glass into the cavity 30 of the blank mold 13. Thereafter, the funnel is removed and a baffle covers the opening and air is blown on the gob to seat it on the neck ring 31.

The mold half 14 is shaped similar to the mold half 15. The neck ring 31 is formed in two parts, which permit them to be separated laterally after the parison is transferred from the blank mold into the blow mold to release the parison. Obviously, the mold shapes and neck ring shapes, as well as the funnel shapes, will differ from job to job and machine to machine and are herein illustrated only for purposes of describing the novel mold release agent of the present invention.

Referring now to FIG. 2, it can be observed that the blank mold, which is shown in cross section, is formed by the mold havles 17 and 18 which cooperate with a bottom plate 40 having a surface 41 which is contoured to the shape of the bottom of the bottle being molded. Each of the mold halves 17 and 18 has cavity surfaces 42 and 43, respectively, which are shaped to conform to the desired shape of the bottle. The blank or parison is inserted into position and the mold havles 17 and 18 close around it, and it is thereafter inflated by a burst of air to cause it to conform to the shape of the cavity 44. The mold halves 17 and 18 are separated and the bottle is moved out onto the dead plate 21. It is then transferred to the conveyor 22 where it is carried to an annealing lehr (not shown).

In one method of practicing the present invention, the cavity surfaces were cleaned by sandblasting and a small quantity of carbon monofluoride in powdered form was placed in the cavity. A cotton cloth, preferably a twill, was used to burnish the carbon monofluoride into the cavity surfaces. Thereafter, the mold was heated to a temperature of between 700°–800° F. The treated mold halves were then placed in the machine, with the result that no additional lubrication was needed. The glass gob contacting surfaces 35 and 36 on the funnel 34 were lubricated in a similar fashion by cleaning through gritblasting and burnishing the carbon monofluoride into the surfaces with a cotton cloth. The ring was heated in the same manner as the molds. Carbon monofluoride was applied by the same method to the neck ring with similar good results in that the neck ring ran for more than eight hours without any problems of sticking and no additional lubrication. The test was terminated for reasons other than sticking of the neck ring. It is expected that the carbon monofluoride lubricant would last for several hours. Good results were obtained in using carbon monofluoride having a fluorine to carbon ratio of 0.7/1.00, which is grey. Better results were obtained with carbon monofluroide having a ratio of above 0.99/1.00 and preferably in the range of about 1.12/1.00. The temperature resistance of the latter lubricant is increased and the powder is practically pure white in the higher ratio so that any decomposition will result in a colorless, odorless and non-toxic gas.

In another method, the surfaces which come into contact with the hot gob of glass, i.e., the funnel, mold cavities and neck ring are cleaned with a degreaser such as toluene, chlorinated solvents, xylene, acetates or the like. Subsequent to cleaning, the cleaned parts are heated to 750° F. for about one-half hour to assure that all of the residue is driven off. The surface may be further cleaned and roughened by gritblasting or the like. Thereafter, the carbon monofluoride is coated by spreading a small quantity onto the surface and burnishing with a cotton cloth or wire brushing it into the metal. In most instances, the molds and other parts are formed of cast iron, which has a high degree of porosity. By repeated application on a roughened surface, a fairly good coating can be embedded and built on the surface. The parts which are lubricated in this fashion are then heated to a temperature of between 600°–800° F. and thereafter installed in the glass molding machine. No further lubrication is necessary and, should any decomposition occur, there is absolutely no smoke.

In one other method of lubrication, the carbon monofluoride was mixed in an aqueous solution with a few drops of tetrahydrofuran added to enhance the dispersion. The material was then sprayed into the hot molds during the molding operation, with the application of air pressure. Agitation of the aqueous solution was required in order to keep the carbon monofluoride uniformly distributed in the solution. This was accomplished with carbon monofluoride having a ratio of 1.12/1.00.

As is evident, in most instances, the dry lubricant approach will be preferred since, once applied, it will require no more of the machine operators's time. Also, in the dry form, the material may be applied with a greater degree of uniformity.

While the above invention describes the mold lubricant method in considerable detail, these are only to be considered as preferred forms of practicing the invention. There is no intention to be limited as stated, and the procedure may be modified, the precise proportions and materials utilized may be varied, and other materials having equivalent properties may be employed if desired without departing from the spirit and scope of the invention as set forth in the appended claims.

We claim:

1. In the method of manufacturing glass by shaping a molten gob of glass into a shape conforming to the shape of a cavity in a mold, said mold being formed of metal or the like, the improvement comprising coating said mold cavity which contacts said molten gob of glass during shaping with carbon monofluoride to provide relative permanent lubrication.

2. The method of manufacturing glass as defined in claim 1 wherein the ratio of fluoride to carbon is in the ratio of greater than 0.7/1.0.

3. The method of manufacturing glass as defined in claim 1 wherein the ratio of fluorine to carbon is in the ratio of greater than 0.99/1.0.

4. The method of manufacturing glass as defined in claim 1 wherein the fluoride to carbon ratio is in the ratio of 1.12/1.0.

5. The method of lubricating a mold for use in glass manufacturing, said mold being formed of metal or the like and having a cavity formed with recessed surfaces and being adapted for use in shaping a molten gob of glass into a desired shape-sustaining configuration, said method comprising cleaning said surfaces of said cavity of said mold, applying carbon monofluoride to said surfaces of said cavity, and heating said mold to a temperature of about 700° F.

6. The method of lubricating a mold for use in glass manufacturing as defined in claim 5 wherein said carbon monofluoride is applied to said cavity by burnishing.

7. The method of lubricating a mold for use in glass manufacturing as defined in claim 5 wherein said cavity is cleaned with a degreasing agent and heated to eliminate any residue of said degreasing agent prior to applying said carbon monofluoride.

8. The method of lubricating a mold for use in glass manufacturing as defined in claim 5 wherein said carbon monofluoride is applied to said mold cavity by spraying it onto said surfaces in an aqueous solution.

9. The method of lubricating a mold for use in glass manufacturing as defined in claim 5 wherein said carbon monofluoride is applied in dry form by brushing it onto the surfaces of said cavity.

10. The method of lubricating a mold for use in glass manufacturing as defined in claim 5 wherein a neck ring is lubricated by said method.

11. The method of lubricating a mold for use in glass manufacturing as defined in claim 5 wherein a bottom plate is lubricated by said method.

12. In the manufacturing of glass wherein a gob of molten glass falls through a chute into a mold formed of metal or the like, said mold being adapted for shaping said gob into a glass object, the improvement which comprises coating surfaces on said mold coming into contact with said molten glass with a stoichiometric composition known as $(CF_x)_n$ to provide permanent lubrication.

13. The improvement according to claim 12 wherein the ratio of fluorine to carbon is greater than 0.7.

14. The improvement according to claim 13 wherein the ratio of fluorine to carbon is greater than 1.00.

* * * * *